(12) United States Patent
Reye et al.

(10) Patent No.: US 8,444,090 B2
(45) Date of Patent: May 21, 2013

(54) TRANSVERSE BUTT CONNECTION BETWEEN TWO FUSELAGE SECTIONS

(75) Inventors: Volker Reye, Hamburg (DE); Stefan Tacke, Buxtehude (DE); Stephan Mischereit, Winsen (DE)

(73) Assignee: Airbus Operations GmbH, Hamburg (DE)

( * ) Notice: Subject to any disclaimer, the term of this patent is extended or adjusted under 35 U.S.C. 154(b) by 299 days.

(21) Appl. No.: 12/735,799

(22) PCT Filed: Feb. 16, 2009

(86) PCT No.: PCT/EP2009/051776
§ 371 (c)(1),
(2), (4) Date: Aug. 18, 2010

(87) PCT Pub. No.: WO2009/112327
PCT Pub. Date: Sep. 17, 2009

(65) Prior Publication Data
US 2010/0320322 A1 Dec. 23, 2010

Related U.S. Application Data

(60) Provisional application No. 61/035,057, filed on Mar. 10, 2008.

(30) Foreign Application Priority Data

Mar. 10, 2008 (DE) .......................... 10 2008 013 365

(51) Int. Cl.
*B64C 1/06* (2006.01)

(52) U.S. Cl.
USPC .......................................... 244/119; 244/131

(58) Field of Classification Search
USPC ................. 244/119, 131, 117 R, 120
See application file for complete search history.

(56) References Cited

U.S. PATENT DOCUMENTS 2,405,643 A * 8/1946 Crot .................................. 52/465
4,113,910 A * 9/1978 Loyd .............................. 428/162
(Continued)

FOREIGN PATENT DOCUMENTS

| DE | 699 11 507 | 6/2004 |
| DE | 10 2005 033 992 | 4/2007 |
| EP | 1 081 043 | 3/2001 |

OTHER PUBLICATIONS

English translation of the International Preliminary Report on Patentability and Written Opinion in corresponding PCT Application PCT/EP2009/051776 mailed Oct. 14, 2010.

(Continued)

*Primary Examiner* — Tien Dinh
(74) *Attorney, Agent, or Firm* — Jenkins, Wilson, Taylor & Hunt, P.A.

(57) ABSTRACT

A transverse butt connection between two fuselage sections, more particularly for creating a fuselage cell for an aircraft, can have a number of stringers arranged spaced out uniformly parallel to one another inside on an outer skin. In order to enable a universal tolerance compensation with standardised compensating means within a predetermined tolerance band between two fuselage sections which are to be joined together, both end areas of the fuselage sections can have on the inside oppositely inclined skin wedge surfaces and the connection of the two end areas is carried out by a circumferential transverse butt strap which is provided with two oppositely inclined transverse butt strap wedge surfaces in the underneath area wherein a wedge can be pushed in between each one transverse butt strap wedge surface and a skin wedge surface for tolerance compensation between the fuselage sections.

20 Claims, 2 Drawing Sheets

U.S. PATENT DOCUMENTS

| | | | |
|---|---|---|---|
| 4,892,435 A | 1/1990 | Anderson | |
| 6,478,922 B1 * | 11/2002 | Rosevear et al. | 156/297 |
| 7,857,258 B2 * | 12/2010 | Normand et al. | 244/120 |
| 8,038,099 B2 * | 10/2011 | Anast et al. | 244/119 |
| 8,042,315 B2 * | 10/2011 | Ashton et al. | 52/783.19 |
| 8,128,028 B2 * | 3/2012 | Grillos | 244/119 |
| 2004/0035979 A1 | 2/2004 | McCoskey, Jr. et al. | |
| 2005/0183260 A1 | 8/2005 | Meyer | |
| 2006/0060705 A1 | 3/2006 | Stulc et al. | |
| 2009/0272846 A1 * | 11/2009 | Anast et al. | 244/120 |
| 2010/0230538 A1 * | 9/2010 | Diaz-Caneja Fernandez | 244/119 |
| 2011/0089291 A1 * | 4/2011 | Dietrich et al. | 244/120 |

OTHER PUBLICATIONS

German Examination Report dated Mar. 23, 2010 for DE 10 2008 013 365.5-22.

International Search Report and Written Opinion in corresponding PCT Application PCT/EP2009/051776 dated May 28, 2009.

* cited by examiner

TRANSVERSE BUTT CONNECTION BETWEEN TWO FUSELAGE SECTIONS

This application is the U.S. national phase of International Application No. PCT/EP2009/051776, filed 16 Feb. 2009 which designated the US and claims priority to German Application No. 10 2008 013 365.5, filed 10 Mar. 2008, and this application claims priority from U.S. Provisional Application No. 61/035,057 filed 10 Mar. 2008; the entire contents of each of the above applications are hereby incorporated by reference.

The invention relates to a transverse butt connection between two fuselage sections, more particularly for providing a fuselage cell for an aircraft, with a number of stringers arranged uniformly spaced out parallel to one another inside on an outer skin.

Furthermore the invention relations to a method for manufacturing a transverse butt connection of this kind between two fuselage sections.

The so-called section-wise construction is widely used in modern aircraft construction. Here fuselage sections, particularly barrel-shaped, are prefabricated elsewhere and then placed side by side and connected to one another to provide a complete aircraft fuselage cell. The fuselage sections can be made in the standard aluminium construction method using high-tensile aluminium alloy materials. Furthermore fuselage sections are increasingly being manufactured by using fibre compound materials, by way of example carbon fibre reinforced epoxy resins. It is hereby necessary to differentiate between the so-called "hybrid method of construction" in which only individual components of the fuselage section are formed with fibre compound materials, and the purely fibre compound method of construction in which all essential structural components of the fuselage cell are formed with fibre-reinforced plastics materials.

One big problem which arises irrespective of whichever material is used is the tolerance compensation between the fuselage sections which are to be joined. In particular the cross-sectional dimensions between the fuselage sections which are to be joined are subject to tolerance deviations inherent in their manufacture and which could only be reduced with an incomparably high expense to the extent where a problem-free joining would be possible without any tolerance compensation measures. Particularly large tolerance deviations occur particularly with the integral fibre compound component production in which fuselage sections are made for large passenger aircraft in the winding process for example by laying down reinforcement fibre strands impregnated with a hardenable plastics material ("prepreg" material).

Up to now tolerances between the fuselage sections being joined are compensated by fluid, that is hardenable and/or solid spacers (so-called "shims") since joining the fuselage sections together under tension is to be avoided for static reasons. The use of shims basically incurs excess weight, reduces the attainable strengths of the resulting transverse butt connection and considerably increases the assembly costs. During assembly the cross-sectional geometries of the fuselage sections are first precision-measured and the fuselage sections are aligned relative to one another using the measured data. The shims are then inserted into the gap forming between the fuselage sections and then hardened where necessary. In the event of using solid shims a number of shims with different geometric dimensions have to be kept available so that the storage and assembly costs are increased.

To complete the connecting process or where applicable even before concluding the hardening process the final connection of the fuselage sections takes place by using conventional connecting elements. Connecting elements used can be for example bracket plates, couplings, rivets or screws. Alternatively, welding or adhesive in at least some areas is also possible.

The object of the invention is to provide a transverse butt connection between two fuselage sections which enables a universal tolerance compensation with standardised compensating means within a predetermined tolerance band between two fuselage sections which are to be joined together.

This is achieved through a transverse butt connection having the features of patent claim 1 as well as a method for manufacturing a transverse butt connection according to patent claim 10. Preferred embodiments are subject of the relevant dependent claims.

Since both end areas of the fuselage sections have oppositely inclined skin wedge faces on the inside and the connection of the two end areas takes place by a circumferential transverse butt strap which is provided with two oppositely inclined transverse butt strap wedge faces in an underneath area whereby a wedge can be pushed between a relevant transverse butt strap wedge face for compensating the tolerance between the fuselage sections, a compensation between two fuselage sections being joined can be carried out within a predetermined tolerance band, particularly with regard to deviating cross-sectional geometries without keeping additional components available.

The tolerance compensation takes place in a simple fashion by sliding standardised wedges different distances in between the transverse butt strap and the end areas of the fuselage sections. For this purpose the end areas of the fuselage sections have slightly oppositely inclined skin wedge faces and the transverse butt strap has in an underneath area similarly oppositely inclined butt strap wedge faces. The wedges are pushed in horizontally between these wedge faces, that is parallel to a longitudinal axis of the section to complete the tolerance compensation.

By means of the transverse butt connection according to the invention it is possible to obtain between the fuselage sections for example an infinite tolerance compensation of up to ±2 mm in the radial direction and a compensation in the order of up to ±4 mm in the axial direction.

According to an advantageous development a slope angle of the skin wedge faces is each time equal to a slope angle of the butt strap wedge faces wherein the slope angle of the wedge faces of each wedge is always the same each time as the slope angle of the skin wedge faces and the slope angle of the butt strap wedge faces.

As a result of the substantially identical slope angle of the wedges as well as of the associated wedge faces of the outer skins of the fuselage sections as well as of the underneath of the butt strap a uniform positioning of all the components is possible in dependence on the horizontal position of the wedges. The preferably identical selected slope angle of all the wedge faces amounts to up to 5°, preferably however less than 2°. As a result of the small angle the tendency of the wedges to be moved in the axial direction through the effect of high radial forces, is reduced.

In a further advantageous development the skin wedge faces are integral constituent parts of the end areas of the fuselage sections.

As a result of this development the number of individual parts of the transverse butt connection is reduced. The circumferential skin wedge faces on the insides in the end areas of the fuselage sections can be formed in a different way in dependence on the material used for the fuselage sections.

In the case of the classic aluminium construction of the fuselage section the wedge-shaped thickening can be formed by way of example by milling. Alternatively it is also possible to add a circumferential ring-shaped wedge section of this kind to the end area of the fuselage sections by welding. As welding method can be considered here in particular the friction stir welding method as well as the laser welding method which produce mechanically heavy-duty seams whose strength does not differ significantly from the load-bearing strength of the raw materials.

In the event that the outer skin of the fuselage section is made for example from fibre compound material by winding, the inclined skin wedge face in the end area of the fuselage sections can be formed by applying a number of reinforcement fibre layers which are more in some areas and then gradually reducing.

According to a further development it is proposed that the transverse butt strap has an annular shape and is formed with at least two circumferential butt strap segments, more particularly with at least six strap segments adjoining one another.

The segmented construction of the substantially ring-shaped transverse butt strap enables an easier manufacture and assembly of the butt strap. The connection of the butt strap segments to one another preferably takes place with abutting joins by using connecting plates. The connection between the butt strap segments and the connecting plates takes place by conventional connecting elements such as for example rivets or screws. Alternatively it is also possible to use an adhesive or welded connection.

A further development of the transverse butt connection proposes that the at least two butt strap segments have a rib profile.

The rib profile is preferably an integral constituent part of the transverse butt strap. In order to reduce the canting of the rib profile in relation to the butt strap at least one optional support angle, more particularly a so-called "clip", can be provided at the side on the rib profile of each butt strap segment. The support angles or "clips" can equally be formed as integral constituent parts of the transverse butt segment. This is as a rule then the case when a material similarity exists between the transverse butt strap segment, the rib profile and the clip, thus by way of example with the continuous use of aluminium alloys or carbon fibre reinforced plastics materials throughout.

In the case of a non-integral configuration of the rib profile and/or the support angle with the transverse butt strap their connection with each other is likewise carried out by conventional connecting elements. Alternatively a connection can also take place by welding or adhesive.

Alternatively the outer skin of the fuselage sections to be joined and/or the transverse butt strap or butt strap segments can be formed with fibre-metal laminates, such as for example GLARE® or with titanium carbon fibre reinforced plastics laminates.

The method according to the invention for manufacturing a transverse butt connection between two fuselage sections with a number of stringers arranged uniformly spaced out parallel to one another at a distance inside on the outer skin has the following steps:

a) joining a circumferential transverse butt strap by placing at least two curved butt strap segments side by side,
b) aligning a first fuselage section at the transverse butt strap,
c) sliding in wedges for tolerance compensation,
d) connecting an end area of the first fuselage section to the transverse butt strap
e) aligning a second fuselage section at the transverse butt strap
f) sliding in wedges for tolerance compensation,
g) connecting an end area of the second fuselage section to be joined to the transverse butt strap.

As opposed to the known procedure when joining fuselage sections together, with the method according to the invention the transverse butt strap represents the actual reference value with which the possibly deviating cross-sectional geometries of the fuselage sections are compensated by means of the wedges. In the method step a) first the circumferential ring-shaped transverse butt strap is produced by connecting at least two transverse butt strap segments. Then in step b) the first fuselage section is aligned in relation to the transverse butt strap (reference). It is hereby reached that a gap which exists as a result of possible tolerance deviations has viewed over the circumference the most constant possible width. After the alignment has been carried out, in step c) the wedges are pushed in and the subsequent connection between the end area of the first fuselage section and the transverse butt strap is carried out by means of conventional connecting elements in step d). In the case of the second-fuselage section which is to be added on the procedure is exactly the same as in steps e) to g) of the method above.

A further development of the method proposes that the first fuselage section and the second fuselage section during alignment are centred in relation to the transverse butt strap.

As a result of this procedure a uniform gap measurement is reached over the circumference of the fuselage sections to be connected so that each adjoining wedge for tolerance compensation is pushed in to roughly the same extent between the transverse butt strap and the inclined end areas of the fuselage sections and a high degree of symmetry of the entire tolerance compensation measure is set.

Further advantageous configurations of the transverse butt connection and of the method are apparent from the following description of preferred embodiments whereby reference is made to the accompanying drawings.

In the drawing the same structural elements each have the same reference numerals.

FIG. 1 shows a principle illustration of the transverse butt connection configured according to the invention.

Figure 1:
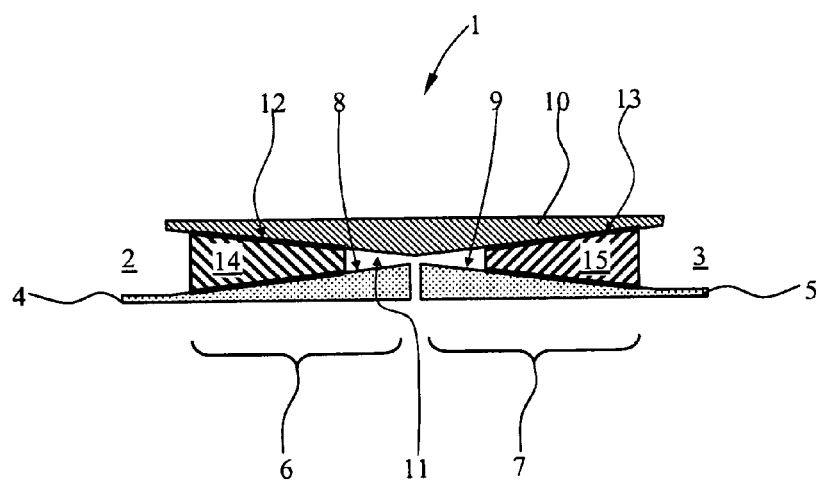
FIG. 1 shows a principle illustration of a section of the transverse butt connection.

A transverse butt connection 1 is formed between a first and a second fuselage section 2, 3 which are each surrounded by an outer skin 4, 5. End areas 6, 7 of the fuselage sections each have an oppositely inclined skin wedge face 8, 9. The connection of the two fuselage sections 2, 3 is made by means of a ring-shaped transverse butt strap 10. The transverse butt strap 10 has in the underneath area 11 two oppositely inclined butt strap wedge faces 12, 13 which adjoin one another in the centre. A wedge 14, 15 is pushed in between the transverse butt strap 10 and each end area 6, 7 of the fuselage sections. A tolerance compensation is undertaken between the fuselage sections 2, 3 in the radial and/or axial direction by the wedges 14, 15. The slope angles of the wedges 14, 15 as well as of the transverse butt strap wedge faces 12, 13 and the skin wedge faces 8, 9 are preferably selected any size and reach angular values of 2° in order to limit the horizontal forces acting on the wedges 14, 15 as well as the bearing stresses of the inserted connecting elements.

Both the transverse butt strap 10 and also the wedges 14, 15 and the outer skins 4, 5 can be formed with an aluminium alloy material and/or with a fibre compound material such as by way of example a carbon fibre reinforced epoxy resin material or a fibre reinforced thermosoftening plastics material. Alternatively the wedges 14, 15 and the transverse butt strap 10 can be made with a titanium or stainless steel alloy whilst the outer skins 4, 5 in this design are made with a fibre compound material such as by way of example with a carbon fibre reinforced epoxy resin or with a carbon fibre reinforced thermoplastics (PEEK).

If by way of example the outer skins 4, 5 of the two fuselage sections 2, 3 are formed with a conventional aluminium alloy material then the inclined end areas 6, 7 can be made by way of example by milling or spark erosion process. Alternatively it is also possible to weld and/or stick a ring wedge having a correspondingly inclined wedge-shaped cross-sectional geometry to the outer skins 4, 5 in order to form the inclined end areas 6, 7. In this connection friction stir welding or laser welding processes are particularly suitable.

If on the other hand the outer skins 4, 5 have been made for example with a fibre compound material in the winding process on a mandrel ("male" tool) then the inclined end areas 6, 7 can be easily created by laying down a number of layers which increases constantly towards the outer edge of the fuselage sections 2, 3. The transverse butt strap 10 can be formed with a fibre compound material, an aluminium alloy material, a titanium alloy, a stainless steel alloy or a combination of these.

Figure 2:
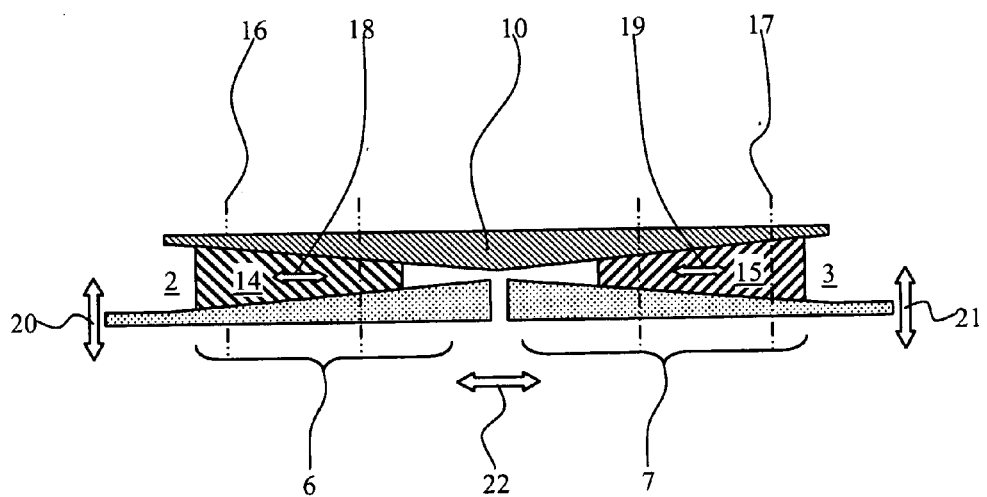
FIG. 2 shows a diagrammatic illustration of the functioning principle for tolerance compensation with displaceable wedges in the transverse butt connection.

FIG. 2 shows diagrammatically the directions in the chamber in which a tolerance compensation is possible by sliding the wedges 14, 15 horizontal. The two wedges 14, 15 are pushed in between the transverse butt strap 10 and the inclined end areas 6, 7 of the fuselage sections 2, 3.

The connection of all the said components is carried out by the conventional connecting elements shown symbolically by chain-dotted lines and of which only two outer connecting elements 16, 17 are provided with a reference numeral. The connecting elements 16, 17 can be formed by way of example with rivets, screws or the like. Alternatively the transverse butt strap 10, the wedges 14, 15 as well as the end areas 6, 7 of the two fuselage sections 2, 3 can also be joined together by any welding and/or adhesive connections. Each wedge 14, 15 has two oppositely inclined wedge faces.

By sliding the two wedges 14, 15 to different distances in the direction of the horizontal arrows 18, 19 it is possible to achieve on the one hand a radial tolerance compensation between the fuselage sections 2, 3 in the direction of the two vertical arrows 20, 21. At the same time by sliding the wedges 14, 15 in the direction of the arrows 18, 19 a tolerance compensation can be effected in the axial direction between the fuselage sections 2, 3 in the direction of the horizontal arrow 22.

With a material thickness of the transverse butt strap 10 of for example 10 mm including the four wedge faces of the wedges 14, 15 and an identical slope angle of all the inclined faces of 2° it is possible to reach a tolerance compensation between the fuselage sections 2, 3 of ±4 mm in the axial direction whilst at the same time a tolerance compensation can be achieved in the radial direction of up to ±2 mm so that a simplified and at the same time quicker assembly of the fuselage sections is possible.

Figure 3:
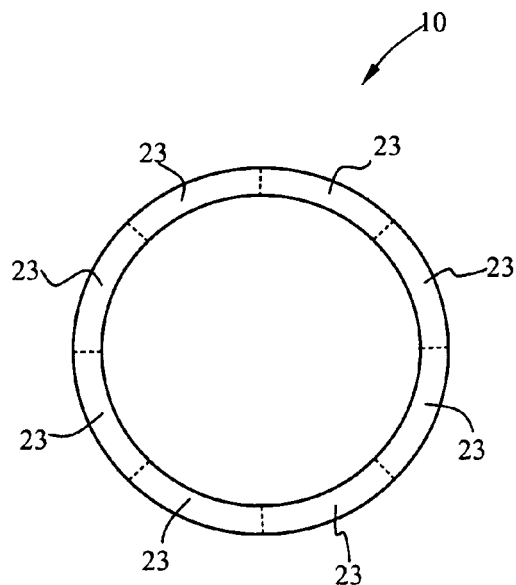
FIG. 3 shows a section of one version of the transverse butt connection.

FIG. 3 illustrates in plan view by way of example the construction of the ring-shaped transverse butt strap with overall eight butt strap segments for connecting fuselage sections having a circular shaped cross-sectional geometry.

The transverse butt strap 10 is formed in the embodiment of FIG. 3 with overall eight curved circular segment shaped transverse butt strap segments 23 which are arranged in series and fixedly connected to one another. In general the transverse butt strap 10 is formed with at least two and preferably however six butt strap segments 23. The division shown in FIG. 3 of the transverse butt strap into a total of eight butt strap segments 23 (i.e. 45° divisions) serves only for a simplified diagrammatic illustration. In aircraft construction the real division of a fuselage section in the longitudinal direction (shells with longitudinal seams) is preferably orientated to the different radii of curvature of a selected cross-sectional geometry whereby standard fuselage sections have at least two different radii.

The connection of the transverse butt strap segments 23 takes place each time at their ends in the area of the dotted lines by butt connections which can be screwed, riveted, stuck or even welded. In order to increase the strength it may be necessary to provide on one or both sides of the transverse butt strap segments 23 connecting plates (not shown) to bridge the abutment areas. Alternatively the ends of the transverse butt strap segments 23 can also be connected overlapping.

Transverse butt straps 10 for connecting fuselage sections which have a cross-sectional geometry which deviates from the pure circular geometry shown in FIG. 3 have a curved path locally adapted to this and which deviates from the shape of an ideal circular segment.

Figure 4:
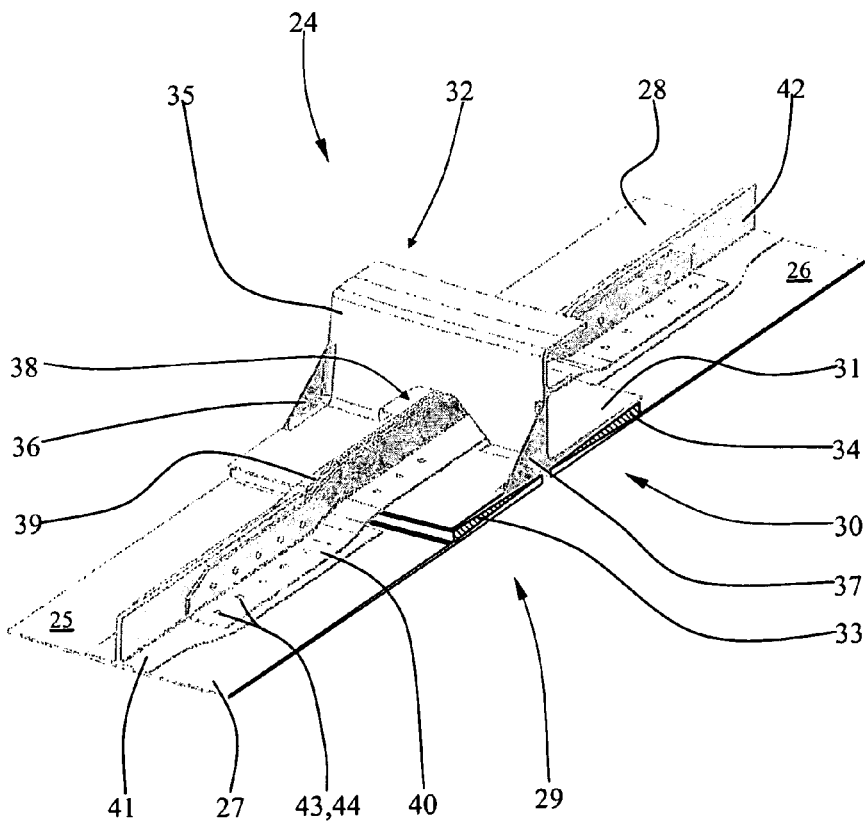
FIG. 4 shows a technical embodiment of the transverse butt connection.

FIG. 4 shows a technical embodiment of a transverse butt connection 24. The transverse butt connection 24 is formed between two fuselage sections 25, 26 which are each covered with an outer skin 27, 28.

Both the end areas 29, 30 have corresponding to the illustration in FIG. 1, two wedge-shaped thickened areas whose inclines are directed opposite one another. A transverse butt strap 31 is formed with a number of transverse butt strap segments (not shown) whose geometrical shape corresponds each time to a multiple of the illustrated (partial) section of a transverse butt strap segment 32. The geometrical configuration of an underneath (not marked) of the transverse butt strap segment 32 corresponds to the underneath 11 of the transverse butt strap 10 in FIG. 1 having two oppositely inclined transverse butt strap wedge faces. Two wedges 33, 34 are again pushed in between the transverse butt strap segment 32 and the end areas 29, of the fuselage sections 25, 26 in order to effect the desired tolerance compensation in the radial and/or axial direction of the fuselage sections 25, 26.

In the illustration of FIG. 4 the transverse butt strap segment 32 or the transverse butt strap 31 has an integrally formed annular rib profile 35 which by means of two likewise integrally formed support angles 36, 37 (so-called "clips") is secured against tilting opposite the two flanges (not marked) on the underneath of the transverse butt strap 31. Both the rib profile 35 and also the support angles 36, 37 can be designed integral or as separate components to the transverse butt strap 31. In the case of a separate design it is necessary to provide additional weight-increasing connecting elements and/or welding or adhesive connections to connect the rib profile 35 and/or the support angles 36, 37 to the transverse butt strap 31.

The transverse butt strap segment 32 has a trapezoidal recess 38 or an aperture through which two stringer couplings 39, 40 run which serve to connect the stringers 41, 42. The outer skin 27, 28, the transverse butt strap segment 32 as well as the stringer couplings 39, 40 are firmly held together with a number of connecting elements of which two front connecting elements as representative of the others were provided with the reference numerals 43, 44. Screws, rivets or the like can be considered by way of example as connecting elements. Furthermore all the said components can alternatively also be stuck and/or welded at least in some areas.

The two wedges 33, 34 can have a curved path each corresponding to the local curvature of the transverse butt strap segment 32. Alternatively a sufficiently fine segmenting of the wedges 33, 34 can be undertaken, that is in order to cover the area of each transverse butt strap segment several wedges are to be provided which are however formed straight per se and positioned side by side.

The outer skins 27, 28, the transverse butt strap segment 32 or the transverse butt strap 31, the stringers 41, 42 as well as the stringer couplings 39, 40 can be formed with aluminium alloys, titanium alloys, stainless steel alloys and/or with fibre compound materials such as by way of example carbon fibre reinforced epoxy resins and/or thermoplastics such as for example "polyether ether ketone" (PEEK). Where applicable the stringer couplings 39, 40 can equally be designed as integral constituent parts of the transverse butt strap segment 32.

In order to carry out the method according to the invention in method step a) first a complete transverse butt strap 31 is fixedly assembled from at least two strap segments 32 as a reference, by way of example riveting or welding. Then in method steps b) and c) a first fuselage section 25 is aligned, that is in particular centred, in relation to the thus assembled ring-shaped transverse butt strap 31, whereby a number of wedges 33, 34 are pushed in between the transverse butt strap segments 32 and the end areas 29, 30 which are inclined wedge-shaped opposite one another (thickened areas) of the outer skins 27, 28 of the fuselage sections 25, 26. Then in the method step d) the outer skins 27, 28 are connected to the wedges 33, 34 and the transverse butt strap 31. In the further method steps e) to g) the corresponding procedure is followed for joining the second fuselage section 26 to the transverse butt strap 31.

List Of Reference Numerals
1 Transverse butt connection
2 First fuselage section
3 Second fuselage section
4 Outer skin (first fuselage section)
5 Outer skin (second fuselage section)
6 End area (first fuselage section)
7 End area (second fuselage section)
8 Inclined skin wedge face
9 Inclined skin wedge face
10 Transverse butt strap
11 Underneath (transverse butt strap)
12 Transverse butt strap wedge face
13 Transverse butt strap wedge face
14 Wedge
15 Wedge
16 Connecting element
17 Connecting element
18 Arrow (horizontal)
19 Arrow (horizontal)
20 Arrow (vertical)
21 Arrow (vertical)
22 Arrow (horizontal)
23 Transverse butt strap segment (transverse butt strap)
24 Transverse butt connection
25 First fuselage section
26 Second fuselage section
27 Outer skin (first fuselage section)
28 Outer skin (second fuselage section)
29 End area (first fuselage section)
30 End area (second fuselage section)
31 Transverse butt strap
32 Transverse butt strap segment
33 Wedge
34 Wedge
35 Rib profile
36 Support angle
37 Support angle
38 Recess (annular rib profile)
39 Stringer coupling
40 Stringer coupling
41 Stringer (T-shaped)
42 Stringer (T-shaped)
43 Connecting element
44 Connecting element

The invention claimed is:

1. Transverse butt connection (1, 24) between two fuselage sections (2, 3, 25, 26) having a plurality of stringers (41, 42) attached to an inner surface of an exterior shell (4, 5, 27, 28) parallel to one another and evenly distributed, characterised in that two end areas (6, 7, 29, 30) of the fuselage sections (2, 3, 25, 26) comprise on an inner surface oppositely inclined skin wedge surfaces (8, 9) and the two end areas (6, 7, 29, 30) are connected by a circumferential transverse butt strap (10, 31) which is provided with two oppositely inclined transverse butt strap wedge surfaces (12, 13) in a region of a lower surface (11) wherein each transverse butt strap wedge surface (12, 13) and each skin wedge surface (8, 9) is configured for receiving a wedge (14, 15, 33, 34) therebetween for compensating for tolerances of the fuselage sections (2, 3, 25, 26).

2. Transverse butt connection (1, 24) according to claim 1 characterised in that an angle of inclination of the skin wedge surfaces (8, 9) is equal to an angle of inclination of the transverse butt strap wedge surfaces (12, 13), respectively, wherein the angle of inclination of the wedge surfaces of each wedge (14, 15, 33, 34) is equal to the angle of inclination of the skin wedge surfaces (8, 9) and the angle of inclination of the transverse butt strap wedge surfaces (12, 13), respectively.

3. Transverse butt connection (1, 24) according to claim 1 characterised in that the skin wedge surfaces (8, 9) are integral constituents of the end areas (6, 7, 29, 30) of the fuselage sections (2, 3, 25, 26).

4. Transverse butt connection (1, 24) according to claim 1 characterised in that the transverse butt strap (10, 31) has an annular shape and is formed with at least two circumferential transverse butt strap segments (23, 32).

5. Transverse butt connection (1, 24) according to claim 4 characterised in that the at least two transverse butt strap segments (23, 32) have a rib profile (35).

6. Transverse butt connection according to claim 4 characterised in that the at least two circumferential transverse butt strap segments comprise at least six adjoining transverse butt strap segments.

7. Transverse butt connection (1, 24) according to claim 1 characterised in that the stringers (41, 42) are each connected to at least one stringer connector (39, 40).

8. Transverse butt connection (1, 24) according to claim 1 characterised in that the transverse butt strap (10, 31) is connected to the end areas (6, 7, 29, 30) of the fuselage sections (2, 3, 25, 26) by connecting elements (16, 17, 43, 44).

9. Transverse butt connection according to claim 8 characterised in that the connecting elements comprise rivets or screws.

10. Transverse butt connection (1, 24) according to claim 1 characterised in that at least one fuselage section (2, 3, 25, 26) is formed with a fibre compound material.

11. Transverse butt connection according to claim 10 characterised in that the fibre compound material comprises a carbon fibre reinforced epoxy resin.

12. Transverse butt connection (1, 24) according to claim 1 characterised in that at least one fuselage section (2, 3, 25, 26) is formed with an aluminium alloy material.

13. Transverse butt connection according to claim 1 characterised in that the two fuselage sections comprise sections of a fuselage cell for an aircraft.

14. Method for manufacturing a transverse butt connection (1, 24) between two fuselage sections (2, 3, 25, 26) having a plurality of stringers (41, 42) attached to an inner surface of an exterior shell (4, 5, 27, 28) parallel to one another and evenly distributed, comprising the steps:
   a) assembling a circumferential transverse butt strap (10, 31) by adjoining at least two curved transverse butt strap segments (23, 32),
   b) aligning a first fuselage section (2, 25) to the transverse butt strap (10, 31),
   c) inserting wedges (14, 15, 33, 34) compensating for tolerances,
   d) connecting an end area (6, 29) of the first fuselage section to the transverse butt strap (10, 31),
   e) aligning a second fuselage section (3, 26) to the transverse butt strap (10, 31),
   f) inserting wedges (14, 15, 33, 34) compensating for tolerances,
   g) connecting an end area (30) of the second fuselage section (3, 26), which is to be added, the transverse butt strap (10, 31).

15. Method according to patent claim 14 characterised in that the first fuselage section (2, 25) and the second fuselage section (3, 26) are centred with respect to the transverse butt strap (10, 31) while being aligned.

16. Method according to claim 14 characterised in that the stringers (41, 42) are each connected by at least one stringer connector (39, 40).

17. Method according to claim 14 characterised in that one end area (6, 7, 29, 30) of each fuselage section (2, 3, 25, 26) is connected to the transverse butt strap (10, 31) by connecting elements (16, 17, 43, 44).

18. Method according to claim 17 characterised in that the connecting elements comprise rivets or screws.

19. Method according to claims 14 characterised in that the transverse butt strap segments (23, 32) are connected by coupling elements.

20. Method according to claims 19 characterised in that the coupling elements comprise connecting straps.

* * * * *